United States Patent
Sethuramalingam et al.

(10) Patent No.: US 9,715,400 B1
(45) Date of Patent: Jul. 25, 2017

(54) PERFORMING CONFIGURATION AND OPERATING SYSTEM IDENTIFICATION FOR VIRTUAL MACHINE IMAGES

(71) Applicant: Amazon Technologies, Inc., Seattle, WA (US)

(72) Inventors: Ekanth Sethuramalingam, Milpitas, CA (US); Amita Ekbote, San Francisco, CA (US); Hari Subramanian, Santa Clara, CA (US); Nagaraju Shiramshetti, Santa Clara, CA (US); Sudharsan Balakrishnan Sripadham, Menlo Park, CA (US); Raviprasad Venkatesha Murthy Mummidi, Mountain View, CA (US); Sophia Yeemei Tsang, Saratoga, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/754,359

(22) Filed: Jun. 29, 2015

(51) Int. Cl.
*G06F 9/455* (2006.01)
*G06F 9/48* (2006.01)

(52) U.S. Cl.
CPC ........ *G06F 9/45533* (2013.01); *G06F 9/4856* (2013.01)

(58) Field of Classification Search
None
See application file for complete search history.

(56) References Cited

U.S. PATENT DOCUMENTS

| | | | |
|---|---|---|---|
| 9,317,311 B2 * | 4/2016 | Anderson | G06F 9/45533 |
| 2010/0106885 A1 * | 4/2010 | Gao | G06F 9/45537 711/6 |
| 2014/0096133 A1 * | 4/2014 | Kundu | G06F 9/455 718/1 |
| 2014/0359617 A1 * | 12/2014 | Fontignie | G06F 8/65 718/1 |
| 2015/0020069 A1 * | 1/2015 | Patani | G06F 9/45558 718/1 |

* cited by examiner

*Primary Examiner* — Gregory A Kessler
(74) *Attorney, Agent, or Firm* — Seed IP Law Group LLP

(57) ABSTRACT

Techniques are described for importing and using virtual machine images in configured manners, such as by a virtual machine image importation service on behalf of clients. An image may be retrieved based on a client-provided location, and various characteristics of the image may be identified via application of multiple heuristic or other assessment tests to various aspects of the retrieved image such as a master boot record, filesystem, or directory structure of the image to determine a testing vector that is compared to identification vectors associated with known operating systems, in order to automatically determine a specific operating system installed on the image to be imported. Modifications may be made to drivers, configuration and system files of the retrieved image based on the identified operating system and other image characteristics.

18 Claims, 6 Drawing Sheets

PERFORMING CONFIGURATION AND OPERATING SYSTEM IDENTIFICATION FOR VIRTUAL MACHINE IMAGES

BACKGROUND

The advent of virtualization technologies for commodity hardware has provided benefits for many customers with diverse needs, allowing various computing resources to be efficiently and securely shared between multiple customers. For example, virtualization environments such as those provided by VMWare, XEN, Hyper-V and User-Mode Linux may allow a single physical computing machine to be shared among multiple users by providing each user with one or more virtual machines hosted by the single physical computing machine. Each such virtual machine may be a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

However, difficulties exist with the use of virtualization technologies, including with respect to efficient migration or importation of machine images to use as the basis for executing virtual machines.

DETAILED DESCRIPTION

Figure 1:
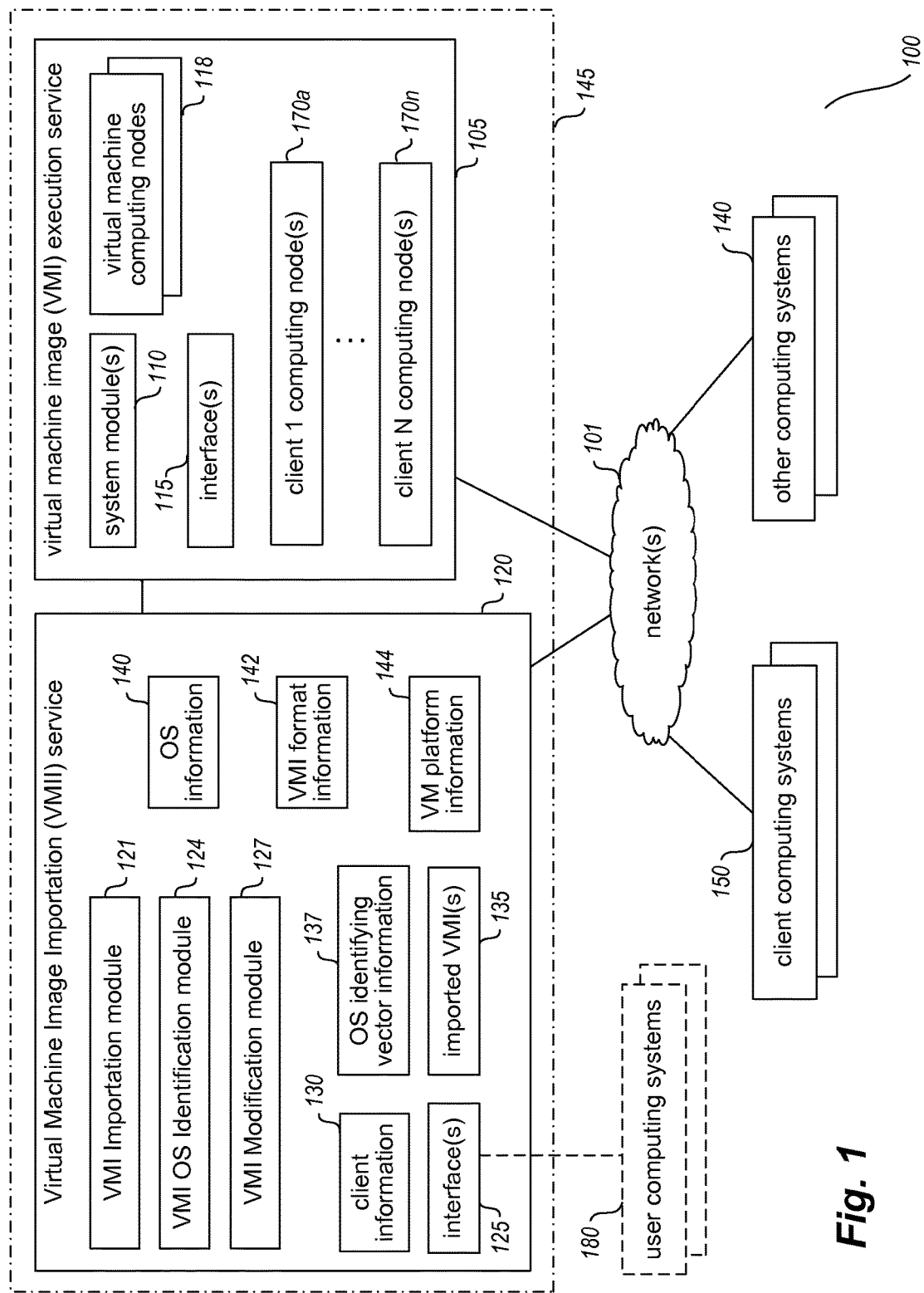
FIG. 1 is a network diagram illustrating an example networked environment in which a service may be used for importing virtual machine images in configured manners.

Techniques are described for importing and using virtual machine images and other software images. In at least some embodiments, an image may be analyzed to identify an operating system installed on the image, such as by analyzing a disk image file for the image without executing the image, and modifications may be made to the imported image based on the identified operating system ("OS"), such as to install one or more device drivers or to modify configuration or system files of the identified operating system. As one non-exclusive example, an image may be intended to be executed as a virtual machine, such as by a virtual machine image execution service, and automated operations may be performed to make OS-specific modifications to the imported image in order to support such execution based on identifying an operating system identified as being installed on the image.

In at least some embodiments, the executable software images being imported are virtual machine images (e.g., images that are bootable or otherwise loadable by a hosted virtual machine in a particular virtualization environment). While some of the document herein discusses virtual machine images for the purpose of illustration and specificity, it will be appreciated that the described techniques may be used with other types of software images, including software images that are executable in host environments that are not hosted virtual machines.

Identification of an operating system installed on an imported image may include, in certain embodiments, automated operations by one or more computing systems of a Virtual Machine Image Importation (VMII) service to apply multiple assessment tests to various aspects of the imported image. As a non-exclusive list, such assessment tests may include heuristic assessment tests that assess one or more of the following: a master boot record of the imported image; a type of filesystem within the imported image; a directory structure or directory names found in the imported image; the presence or absence of particular system files within the imported image, as well as the contents of such system files that are present; the presence or absence of particular configuration files within the imported image, as well as the contents of such system files that are present; the presence or absence of particular license files within the imported image, as well as the contents of such system files that are present; etc. The results of such assessment tests may, in at least some embodiments, be compared with one or more identification vectors (such as sets of parameters or other identifying characteristics) that are respectively associated with known operating systems. In this manner, an assessed virtual machine image ("VMI") or other software image may be identified by the VMII service as having one or more particular characteristics, such as one or more installed operating systems, a version of each such operating system, a type of each such operating system (e.g., 32-bit, 64-bit, etc.), a filesystem type, a license type, or other characteristics. In certain embodiments, the VMII service may prompt a client to confirm or override one or more characteristics identified by the VMII service with respect to the specified image. In addition, in at least one embodiment, the VMII service may allow a client to indicate any known characteristics of a VMI designated for importation prior to the VMII service attempting to identify characteristics of the designated VMI.

The VMII service may, for a VMI received for importation, mount or otherwise attach the VMI in certain embodiments to one or more computing systems, including one or more virtual machines, for analysis and/or modification as part of the importation process. For example, in at least one embodiment, an image disk for a VMI received for importation may be attached as a block storage device to a virtual machine that includes software for performing appropriate heuristic assessment tests on the attached VMI.

The VMII service may determine to make particular modifications to an imported image based on the particular identified operating system of the imported image, on a particular destination platform for execution of one or more virtual machines based on the imported image, or on other suitable criteria. For example, the VMII service may determine that the imported image does not include one or more device drivers suitable for a destination platform that is to be used for executing the imported image (e.g., a virtual machine image execution service that is affiliated with or independent from the VMII service), and may consequently initiate modifications to the imported image in order to install such device drivers. As another example, the VMII service may determine that configuration files present within the imported image include incorrect or incomplete settings for executing the identified operating system on an intended destination platform, and may perform one or more modifications to those configuration files accordingly.

The VMII service may also be implemented and used in various environments. As one example, the VMII service may be implemented by or on behalf of one or more particular clients in some embodiments, such as by a company or other organization on behalf of its employees or other organization members. In such embodiments, the clients of the VMII service may be interested in migrating physical or virtual nodes of a private computer network associated with the client to another computer network, such as one or more virtual networks provided by an online configurable network service. As another example, the VMII service may be implemented as part of an online service that is accessible to external customers (e.g., as a fee-based service) in some embodiments. Such external customers may, for example, use client devices to interact with the online service from remote locations, such as by sending electronic communications over one or more intervening computer networks (e.g., the Internet, cellular telephone networks and other telecommunications networks, etc.) separating the client devices and the online service.

In certain embodiments, various functions provided by the VMII service may be implemented by a local software appliance configured for use at a geographical location associated with the client, with other functions of the VMII service being implemented by one or more servers of the VMII service located remotely from the client's geographical location. For example, the local software appliance may be provided or otherwise geographically located at the client location and may facilitate the receiving of one or more disk images or other images for importation by the VMII service, such as via a local network connection to one or more computing systems also geographically located at the client location—such local processing at the client's location may enable the transmission of such images over networks external to the client location to be eliminated or minimized, facilitating convenient importation of large volumes of such images, etc. In addition, the local appliance may include software for performing one or more heuristic assessment tests on components of the received images, such as to generate one or more distinct test vectors based on assessment test results for each of the received images. In at least some embodiments, the local appliance may then transmit one or more electronic communications representing the distinct test vectors to a remote server of the VMII service, which may then remotely perform a comparison of the distinct test vectors with a plurality of identification vectors associated with known operating systems, and optionally identify other characteristics of the image(s) to be imported. The operating system identification and/or additional image characteristics may then be returned to the local appliance by the remote VMII server. In certain embodiments, the local appliance may perform various modifications with respect to the received images based on the image characteristics reported by the remote VMII server, such as based on additional information from the remote VMII server related to the identified operating system, to a specified platform for executing virtual machines based on the received images, etc. As described in greater detail elsewhere herein, such modifications may also include the removal of some or all client-specific content from the received images, as well as the installation of various device drivers to facilitate the importation of the received images and execution of virtual machines based thereon. In other embodiments, such a local appliance may perform all of the functions of the VMII service for at least some software images being imported.

The VMII service may also implement and provide one or more interfaces for use by customers or other users who are clients of the VMII service, such as one or more GUIs ("graphical user interfaces") via which clients may specify and configure particular types of operations to be performed and may obtain results of such operations; and/or one or more defined APIs ("application programming interfaces") or other programmatic interfaces via which programs executing on the clients' computing devices may exchange electronic communications of defined types. Such service-provided interfaces may enable clients to perform any of the types of activities described herein, such as one or more of the following: to register with the VMII service; to request importation of a specified virtual machine image; to specify one or more network locations in which a specified virtual machine image or components thereof may be located (e.g., via a Uniform Resource Locator or other manner of specifying such location); to monitor the importation of one or more virtual machine images (e.g., to receive one or more status messages regarding the importation process); to request export of a previously imported machine or virtual machine as a virtual machine image in one or more formats; to affirm or override an identification indicated by the VMII service of an installed operating system or other characteristics of a particular virtual machine image; to provide licensing information related to an imported virtual machine image or virtual machines executed based thereon; etc.

The VMII service may further be configured to perform additional automated operations for some or all VMIs that it analyzes or modifies in at least some embodiments and situations. As one example, the VMII service may be configured to execute or otherwise deploy an imported VMI of a client on behalf of the client, or to otherwise provide the client with access to a copy of the imported VMI. In some embodiments, the VMII service may be part of an online image execution service or may otherwise be affiliated with or in communication with one or more such online image execution services, and if so the VMII service may be configured to perform automated operations to cause an imported VMI that is analyzed or modified to be executed via such an online image execution service (e.g., in exchange for fees that the client pays to the online image execution service as a customer of the online image execution service). Such automated operations may include providing a copy of an imported VMI for a client to the online image execution service, along with instructions to execute that imported VMI on behalf of that client. In other embodiments and situations, the VMII service may provide its own computing machines to execute at least some of the imported VMIs on behalf of clients, such as for testing purposes and/or for ongoing use by the clients.

Additional automated operations that the VMII service may be configured to perform for some or all VMIs that it analyzes or modifies during the importation process may include testing and other validation of such imported VMIs in at least some embodiments and situations. Such validation may include using computing machines that the VMII service provides for such use and/or interacting with one or more online image execution services to perform such validation. The validation to perform for a particular imported VMI of a client may be configurable by the client in at least some embodiments and situations, while in other embodiments all imported VMIs or no imported VMIs may receive such validation. As one example, some or all imported VMIs may be tested by initiating a boot or other startup of the imported VMI to determine if modifications to the imported VMI have succeeded (assuming that the imported VMI is a bootable image), including to verify that the imported VMI successfully boots or that any application programs of the imported VMI that are configured to execute on boot have such execution occur without error. Results of any such validation operations may be used in various manners, including to provide them to the client (e.g., via a provided interface of the VMII service), to generate an error message or condition for an imported VMI that fails one or more validation tests, to initiate corrective activities (such as additional or revised modifications) regarding an imported VMI that fails one or more validation tests, etc.

Use of the described techniques may provide various types of benefits, including to reduce user error by avoiding user input for identification of an operating system included in an imported VMI; to provide a more efficient, reliable and consistent mechanism for importing multiple virtual machine images and other software images; to facilitate and/or automate the identification of licensing pricing and authorization models based on identification of operating systems included in an imported VMI; to facilitate the migration of one or many network computing nodes to one or more virtualized environments; to assist an affiliated or other image execution service in obtaining images to execute on behalf of customers of the image execution service, etc.

For illustrative purposes, some embodiments are described below in which specific types of software images, image analysis operations, operating system identification operations, image modification operations, image validation operations and image execution operations are performed, including with respect to using such techniques with an online service that provides functionality to import virtual machine images in configured manners on behalf of customers, and/or to using such techniques on behalf of an affiliated or other image execution service. These examples are provided for illustrative purposes and are simplified for the sake of brevity, and the inventive techniques may be used in a wide variety of other situations, some of which are discussed below.

FIG. 1 is a network diagram illustrating an example of a networked environment 100 that includes an online network-accessible Virtual Machine Image Importation (VMII) service providing clients with client-configurable functionality for importing virtual machine images (VMIs). After such a VMI is imported for a client by the VMII service, the client may further obtain access to the VMI in various manners, such as to obtain a copy for execution on hosted virtual machines under control of the client, to have an online virtual machine image execution service execute the VMI for the client, etc. FIG. 1 further illustrates an example of such a virtual machine image execution service 105 that provides and manages virtual machine computing nodes available for use in providing execution capacity to execute virtual machine images for multiple customers. In the illustrated embodiment, the virtual machine image (VMI) execution service 105 and the VMII service 120 may be integrated together into a single network-accessible service 145, such as if both are operated by the same operator entity, but in other embodiments may have other forms (e.g., being separate systems operated by separate entities, being in the form of a single system that includes at least some of the described functionality of both the VMI execution service and the VMII service, having only the VMII service without any VMI execution service, etc.).

In the example of FIG. 1, various clients (not shown) are using various client computing systems 150 to exchange various electronic communications over network(s) 101, such as to interact via those electronic communications with one or both of the online VMII service and the online VMI execution service. Some such clients may in various circumstances interact with only one of the two services, while other such clients may interact with both of the services. In other embodiments, the VMII service may operate on behalf of a particular group of one or more users who use user computing systems 180 to interact directly with the VMII service, such as without having corresponding electronic communications pass over the network(s) 101, including in situations in which the VMII service is implemented by a company (not shown) or other organization (not shown) or is otherwise affiliated with such a company or other organization, and in which the one or more users are employees of the company or otherwise members of the organization.

The functionality of the VMII service 120 is implemented in the example embodiment of FIG. 1 by VMI importation module 121, VMI operating system identification module 124, and VMI modification module 127. Other modules may be included in other embodiments, and the described functionality of the modules 121, 124 and 127 may be provided by fewer or additional modules in certain embodiments. In particular, the functionality of the VMII service may be implemented by one or more configured computing systems (not shown), such as by having those computing systems execute the modules 121, 124 and 127 to configure those computing systems to provide the functionality of the VMII service. A customer or other user (referred to generally herein as a client of the VMII service) may then use a client computing system/device 150 or 180 to interact with the VMII service to configure importation processes to be performed for one or more VMIs for the client, as well as obtain access to such VMIs imported by the VMII service. In this illustrated example, the VMII service provides one or more interfaces 125 that such clients may use to interact with the VMII service, such as one or more GUIs and/or one or more APIs. The VMII service 120 may include various information to support processes for the importation of virtual machine or other images. For example, in the depicted embodiment, the VMII service 120 includes client information 130 (such as client account information, client billing information, client history information, etc.); imported images 135; operating system identifying vector information 137; operating system information 140; virtual machine image format information 142; and virtual machine platform information 144.

The VMII service may exchange various electronic communications with client computing systems 150, user computing systems 180, or other computing systems 140 in order to provide various functionality to clients or other users associated with such computing devices. For example, a client may typically interact with the VMII service 120 via interfaces 125 in order to register with the VMII service, to request or otherwise initiate importation of a specified virtual machine image; to specify one or more network locations in which a specified virtual machine image or components thereof may be located (e.g., via a Uniform Resource Locator or other manner of specifying such location); to affirm or override an identification indicated by the VMII service of an operating system included in a specified image, or of other characteristics of the specified image; to provide licensing information related to an imported virtual machine image or virtual machines executed based thereon;

to request export of a specified virtual machine as a virtual machine image in one or more formats; etc.

In certain embodiments, the VMII service may require client VMIs provided for importation to comply with various criteria, such as to have one or more specified image formats (e.g., RAW format, Dynamic Virtual Hard Disk or "VHD" format, ESX Virtual Machine Disk or "VMDK" format, Open Virtual Appliance or "OVA" format, etc.); have one or more specified filesystems (e.g., NTFS, GPT, ext2, ext3, ext4, Btrfs, JFS, XFS, etc.); or to import only VMIs with certain operating systems installed (e.g., one or more specified versions of Microsoft Windows Server, of Microsoft Windows, or of various Linux/Unix distributions, such as various versions of Red Hat Enterprise Linux, CentOS, Ubuntu or Debian distributions). In addition, in various embodiments the VMII service may provide one or more error messages to a client attempting to import a VMI that contains an operating system, filesystem and/or format other than those specified on a "whitelist" of acceptable types. For example, the VMII service may provide a whitelist that specifies one or more acceptable combinations of operating system and filesystem. Furthermore, in certain embodiments the VMII service may provide and/or enforce predefined rules regarding particular types of supported virtual machines based at least in part on the identified operating system installed within the corresponding imported VMI. For example, the VMII service may import VMIs running Microsoft Windows as the basis for virtual machines of any instance type, but may limit the instance type of virtual machines based on an imported VMI running Linux or a particular Linux distribution. In at least one embodiment, the VMII service may completely disallow importation of VMIs having particular combinations of operating system, filesystem, etc., either in lieu of or in addition to providing one or more error messages to a client attempting to import a VMI with such disallowed characteristics or combination of characteristics.

The VMII service may further provide subscription and/or registration services to clients, such that clients may specify account information (e.g., user name, billing information, etc.), accept terms of use, etc. In some embodiments, after a client interacts with the VMII service to subscribe and/or register for services, the client may be issued one or more identifiers (e.g., keys, tokens, usernames, etc.) that are associated with the client and are to be used in conjunction with importing virtual machine images on behalf of the client.

In addition, at least some of the functionality of the VMI execution service is provided in this example by one or more system modules 110 of the VMI execution service 105. The modules 110 may, for example, assist particular clients in executing virtual machine images or other programs for the clients on virtual machine computing nodes 118 provided by the VMI execution service, with at least some such clients each having a group 170 of one or more virtual machine computing nodes or other types of computing nodes that are allocated, provisioned and configured to execute images (such as images imported by the VMII service) for those clients. The VMI execution service may further be implemented by one or more configured computing systems (not shown), such as by those computing systems executing the system modules 110 to configure those computing systems to provide the functionality of the VMI execution service. While the VMI execution service makes various virtual machine computing nodes 118 available for executing virtual machine images of the clients in this example, in other embodiments at least some of the computing nodes used by the VMI execution service to execute clients' virtual machine images may be provided in other manners (e.g., made available by the clients and/or by third-parties, such as external computing systems 140, but managed by the VMI execution service).

In some embodiments, the illustrated virtual machine computing nodes 118 are each a virtual machine that is hosted on one or more physical computing systems (not shown) of the VMI execution service. Each of the computing nodes 118 has some amount of computing resources available for executing one or more virtual machine images, which provide a specific amount of execution capacity, such as may be measured, for example, by a quantity of one or more such computing nodes and/or by a combination of one or more of processing capacity (e.g., number and/or size of processing units), memory capacity, storage capacity, network bandwidth capacity, etc. The VMI execution service provider 105 may provide preconfigured computing nodes in some embodiments, with each preconfigured computing node having equivalent or otherwise similar amounts of resources available for executing virtual machine images on behalf of users, while the VMI execution service provider 105 may in other embodiments provide a selection of various different computing nodes from which a client may choose for executing virtual machine images, such as with each selection having varying amounts and/or types of computing resources (e.g., size, speed and/or type of processing units; number of processing units; amount of memory and/or storage; platform configuration, such as 32-bit or 64-bit; etc.).

As discussed in greater detail elsewhere herein, clients may interact with the modules 110 to specify requests to initiate use of computing nodes for execution of virtual machine images on behalf of the clients, such as via one or more interfaces 115 provided by the VMI execution service for use by the clients (e.g., one or more GUIs and/or one or more APIs). The modules 110 may further provide subscription and/or registration services to clients, such that clients may specify information related to one or more virtual machine images to execute on behalf of a client, account information (e.g., user name, billing information, etc.), terms of use, etc. In some embodiments, after a client interacts with the modules 110 to subscribe and/or register for services, the client may be issued one or more identifiers (e.g., keys, tokens, user names, etc.) that are associated with the client and are to be used in conjunction with executing virtual machine images on behalf of the client.

In some embodiments, a client or other user may be charged various fees in association with use of the VMII service, such as based on a number of times that an importation process is initiated, an amount of computing resources and/or time used in performing VMI importation, an amount of storage used, etc. Similarly, a client may be charged various fees in association with use of the VMI execution service, such as based on a number of computing nodes used, a type of computing nodes used, a duration of time the computing nodes are used, particular operations that the computing nodes perform (e.g., data transfer and/or storage), etc. The VMII service may, for example, assign one or more billing codes to an imported VMI based on an identified operating system installed on the VMI (such as at the time the VMI is imported), and such charges may reflect particular fees associated with the assigned billing codes. The assigned billing codes may be associated with each of one or more licensing requirements for the identified operating system, such as may be based on fee schedules for corresponding versions of an operating system, volume licenses, etc.

The network(s) 101 may, for example, be a publicly accessible network of linked networks, possibly operated by various distinct parties, such as the Internet. In other embodiments, the network(s) 101 may be a private network, such as, for example, a corporate or university network that is wholly or partially inaccessible to non-privileged users. In still other embodiments, the network(s) 101 may include one or more private networks with access to and/or from the Internet. In addition, the modules 121, 124, 127 and/or 110 may each include software instructions that execute on one or more computing systems (not shown) by one or more processors (not shown), such as to configure those processors and computing systems to operate as specialized machines with respect to performing their programmed functionality. In addition, the modules and various computing nodes 118 may be provided in various manners, such as at a single data center or otherwise to use a group of co-located computing systems, or instead in a distributed manner using various computing systems in various distinct geographical locations.

Figure 2:
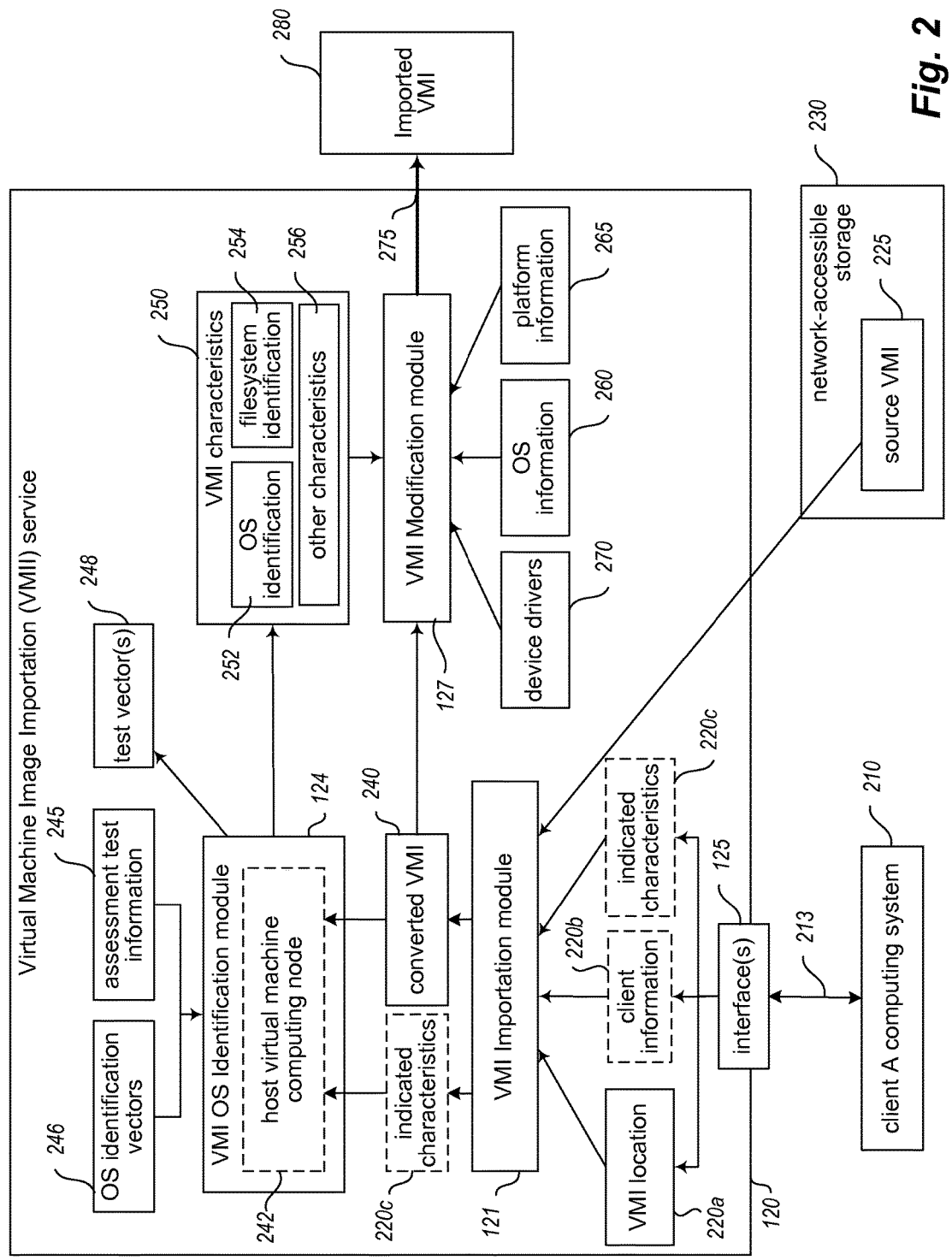
FIG. 2 illustrates an example of importing a virtual machine image in a configured manner.

FIG. 2 illustrates an example of importing a virtual machine image in a configured manner for a client. In particular, FIG. 2 includes some of the elements illustrated in FIG. 1 regarding VMII service 120, as well as additional details. It will be appreciated that various of the details of FIG. 2 are included for illustrative purposes and are non-limiting, with other embodiments and situations not including such details.

In the example of FIG. 2, a particular client (referred to as "client A") is using a client computing system 210 to initiate the importation process via interactions 213 with one or more interfaces 125 of the VMII service 120, such as by exchanging electronic communications corresponding to a request over one or more networks (not shown) to import a specified VMI. As part of the request, client A specifies a location 220a of a virtual machine image to be imported, such as by providing a Uniform Resource Locator ("URL"). In the depicted example, the specified location indicates an identifying file path of source VMI 225 stored by network-accessible storage 230, such as may be accessible via a computing system at a location of the client, that is provided by another online service (e.g., an online storage service, etc.), that is provided by an operator of the VMII service, etc. In addition, in certain scenarios and embodiments, the client A may provide (such as by uploading to the VMII service) the source VMI directly rather than merely providing an indication of a location at which the source VMI is stored. In certain embodiments, a client may provide the location of an indicated manifest file delineating the contents of the source VMI rather than the location of the source VMI itself. In such scenarios, the VMII service may use the indicated manifest file to assemble components of the source VMI indicated by the manifest file as part of the importation process. In certain scenarios and embodiments, the client may provide source VMI 225 as one of multiple disk images, such that the VMI to be imported comprises a "root disk" associated with the other disk images, which the VMI importation module may determine not to import (such as if the other disk images do not include a bootable operating system, etc.). Furthermore, in at least some scenarios and embodiments, the VMII service may provide the client with a unique "import identifier" in response to one or more of the interactions 213, such as to uniquely identify the importation process (e.g., for monitoring or otherwise) prior to the completion or even initiation of that importation process.

Also as part of the interactions 213 with the interfaces of the VMII service, client A may optionally specify various information 220b regarding client A, such as registration information, account information, one or more identifiers associated with the client by the VMII service or other service, etc. The interactions 213 may further include client A optionally providing indications of one or more known characteristics 220c of the VMI to be imported. For example, in certain scenarios, client A may already be familiar with characteristics such as an installed operating system, a filesystem, one or more installed application programs, etc., and may provide indications of such characteristics as part of initiating the importation process. In other scenarios, client A may be unaware of such characteristics or may otherwise not provide such characteristics, and may simply provide the location 220a of the source VMI to be imported.

Upon receiving the information associated with client A's request (including the VMI location 220a and possibly one or more indicated characteristics 220c of the source VMI 225), the VMI importation module 121 retrieves the source VMI from the specified location of network-accessible storage 230. In the depicted embodiment, the VMI importation module ensures that the VMI is in a particular format for the importation process by converting the source VMI to a particular snapshot format or other format for further importation operations. For example, the source VMI may be stored in Dynamic Virtual Hard Disk or "VHD" format, and the importation module may convert the source VMI to Open Virtual Appliance or "OVA" format. In other scenarios and embodiments, the importation module may determine that no conversion is necessary, such as if the source VMI is already in an appropriate format for the additional importation operations.

In the depicted embodiment of FIG. 2, the VMI importation module 121 passes the converted VMI 240, along with any indicated characteristics 220c, to the VMI operating system identification module 124. In the depicted embodiment, the identification module mounts the converted VMI (such as an attached storage disk or other attached block storage) to a host virtual machine computing node 242 in order to analyze the converted VMI. In certain embodiments, other modules (e.g., one or more specialized orchestrator modules, not shown) may perform the mounting of the converted VMI to the host virtual machine computing node. In other embodiments, the identification module may determine to perform testing of the converted VMI without such mounting or attachment. Utilizing assessment test information 245, the identification module applies one or more heuristic assessment tests to various components of the mounted VMI. As non-limiting examples, the components of the mounted VMI to be tested may include a Master Boot Record, a filesystem, a directory structure (such as to determine the presence or organization of particular named folders within the directory structure), the presence or contents of particular system files, the presence or contents of particular configuration files, the presence or contents of particular license files, or other components. In addition, the identification module may consider the indicated characteristics provided by client A, as well as a VMI importation history (not shown) associated with client A, such as to determine whether the client A has provided multiple VMIs with particular characteristics in the past.

In certain embodiments, the identification module 124 may apply one or more of the heuristic assessment tests in stages, such as to apply a first stage of heuristic assessment tests to various components of the mounted VMI in order to determine a general type of operating system, and may subsequently apply a second stage of heuristic assessment tests to such components of the mounted VMI in order to isolate aspects of the operating system indicative of particular versions, distributions, etc. As one specific example, suppose the identification module applies a first stage of assessment tests to a directory structure of the mounted VMI to determine whether the VMI includes particular named directories. In such an example, if the directory structure of the VMI includes directories entitled "windows" or "winnt", and/or entries in a registry entitled "system32/config/software" or "system32/config/system", the identification module may determine that the mounted VMI corresponds to a Microsoft Windows-based image. In contrast, if the directory structure of the VMI includes directories entitled "etc", "grub" or "grub2", the identification module may determine that the mounted VMI corresponds to a Linux-based image. To continue this specific example, assume that based on the results of the applied first stage of assessment tests, the identification module has determined that the mounted VMI corresponds to a Windows-based image. Based on such determination, the identification module may proceed to apply a second stage of Windows-specific assessment tests, such as with respect to particular Windows registry files or entries, in order to obtain Windows version information and processor architecture (e.g., 32-bit or 64-bit architecture). Again continuing this example, based on the results of the previous stages of assessment tests, the identification module may apply additional assessment tests to the registry files to determine additional characteristics of the mounted VMI. Collectively or individually, such test results and characteristics may result in various operating system-specific modifications, as discussed elsewhere herein. In various embodiments, many stages of such heuristic testing may be performed by the identification module.

Using the results obtained from the applied heuristic assessment tests, the identification module 124 generates one or more test vectors 248 for the mounted VMI and compares the generated testing vectors to identification vectors 246, each of which is indicative of a set of parameters associated with a particular known operating system, in order to determine a match between the generated test vectors and one of the identification vectors and thereby determine an identification of an installed operating system of the mounted VMI. In some embodiments and situations, a perfect match may be needed, while in other embodiments a specified threshold may be used for a degree or level of matching. In addition, the identification module may assess various other characteristics of the mounted VMI (e.g., a filesystem type, one or more installed application programs, the presence of various client-specific content, etc.). In at least some embodiments the VMII system may utilize weighting factors with respect to the various heuristic assessment tests, such as to assign a greater weight to particular assessment tests for purposes of generating the one or more test vectors. As discussed in greater detail elsewhere herein, in certain scenarios and embodiments the identification module may additionally assign one or more billing codes (not shown) to the mounted VMI based on the identified characteristics, such as to facilitate automated billing for executing virtual machines based on the VMI once importation is complete (e.g., related to one or more licenses associated with the identified characteristics). For example, the identification module may assign distinct billing codes to the mounted VMI based on the installed operating system, on identified license files within the mounted VMI, or on identified application programs within the mounted VMI.

In certain embodiments, the identification module may additionally generate a confidence rating (not shown) regarding the identification, such as an indication of how closely related (if not identical) the generated testing vectors for the mounted VMI are to the identification vector associated with the identified operating system, such as to reflect the degree of match. In addition, in at least one embodiment the identification module may determine whether the confidence rating exceeds a defined threshold and, if not, take one or more actions to confirm the performed identification. For example, the identification module may prompt the client to affirm, deny, or override the determination of the identified operating system; may apply one or more additional assessment tests to the mounted VMI; etc. In other embodiments, the identification module may perform some or all such client interactions and/or additional assessment tests regardless of whether the confidence rating exceeds a defined threshold, or even if a confidence rating is not determined. In certain scenarios and embodiments (such as if the client indicates that the installed operating system is other than that identified by the identification module), the identification module may store (e.g., as part of the operating system identification vectors 246 of FIG. 2 and/or the operating system identifying vector information 137 of FIG. 1) information indicative of the generated testing vectors and other parameters for the mounted VMI as a new identification vector for the indicated operating system, such as for use in identifying future instances of the indicated operating system when importing additional VMIs.

In the exemplary embodiment of FIG. 2, the operating system identification module 124 passes control of the converted VMI 240 to the VMI modification module 127, to which it also provides the identified VMI characteristics 250 (including operating system identification 252, filesystem identification 254, and other identified characteristics 256). The VMI modification module determines particular modifications to be made to the converted VMI 240 based on the VMI characteristics indicated by the identification module, on operating system information 260, and on destination platform information 265 that reflects an environment in which the modified converted VMI may be executed. For example, in certain scenarios, the modification module may determine to make one or more modifications to various configuration files and/or system files of the identified operating system of the mounted VMI based on information regarding an indicated destination platform on which virtual machines based on the converted VMI are to be executed. In various embodiments, particular VMI characteristics (or combinations thereof) may be associated with particular modification scripts that are executed with respect to the mounted VMI. In addition, in certain embodiments and scenarios, the modification module may determine to "strip" the mounted VMI to produce a "clean" image, such as by removing some or all client-specific files or parameters from the mounted VMI, and may include removal of various application programs, drivers or data files as part of such modifications. In at least one embodiment, the modification module may determine to install or confirm the presence of various device drivers (such as included in device driver database 270) based on the identified operating system or other VMI characteristics, as well as based on information regarding the destination platform.

After the various modifications have been performed, the VMI modification module 127 performs further interactions 275 with the mounted VMI 240 as needed, such as to configure the VMI to be bootable and to optionally perform specified activities upon boot (e.g., to execute one or more installed application programs), and further causes the current state of the mounted VMI to be saved as a new imported VMI 280.

In some embodiments, the modification module 127 may perform further activities to perform one or more validations tests on the imported VMI 280, although such validation activities are not illustrated here. In addition, the modification module 127 may further perform one or more optional interactions (not shown) with a VMI execution service (e.g., VMI execution service 105 of FIG. 1) to cause the imported VMI to be automatically deployed, such as to be executed as one or more virtual machines on behalf of client A.

It will be appreciated that the example of FIG. 2 is included for exemplary purposes and is non-limiting, and that other types of software images, image importation operations, image modification operations, image validation operations and image deployment operations may be used in other embodiments.

Figure 3:
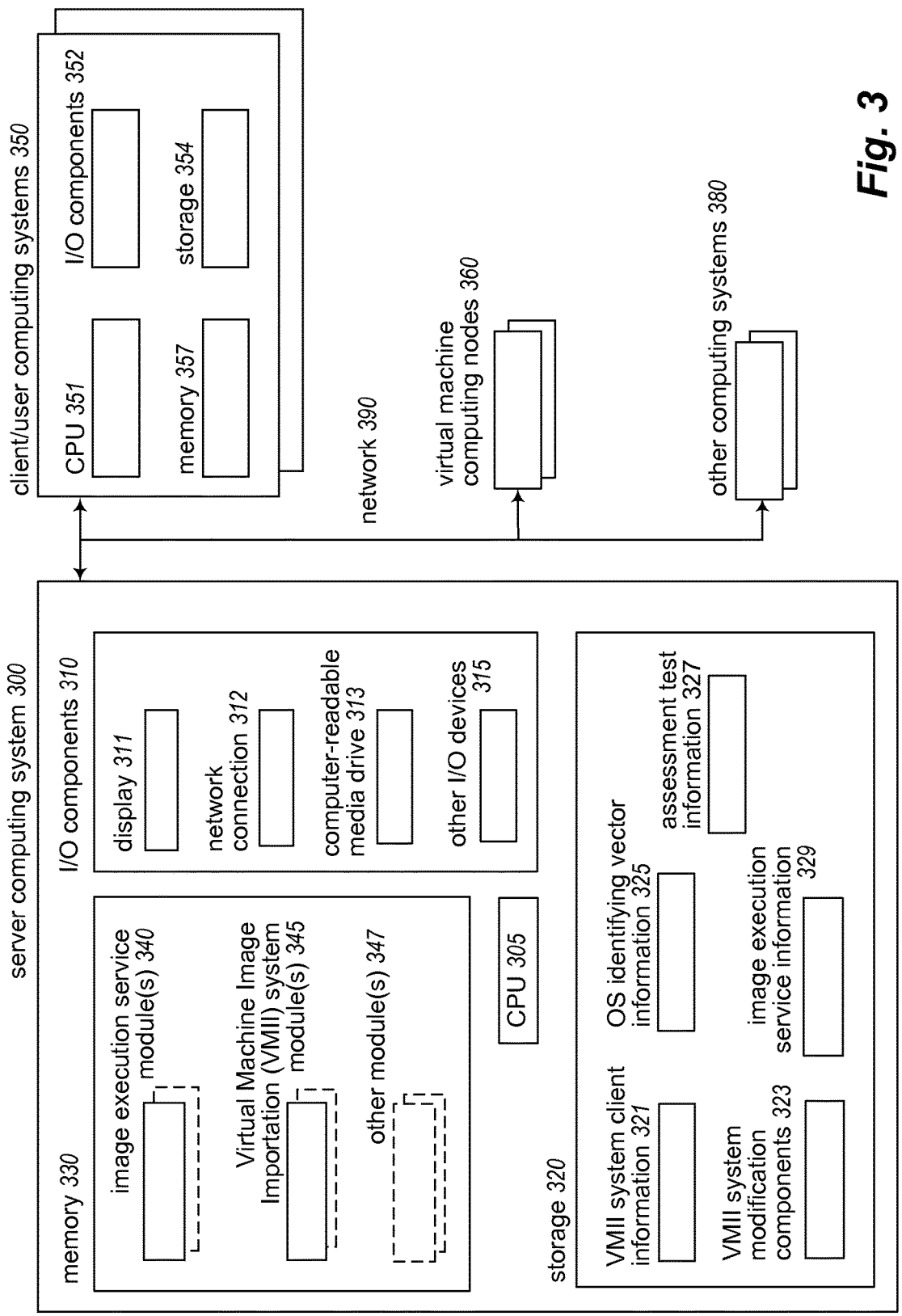
FIG. 3 is a block diagram illustrating example computing systems suitable for executing an embodiment of a system for importing virtual machine images in configured manners.

FIG. 3 is a block diagram illustrating component-level functionality provided by a plurality of electronic circuits that, when in combined operation, are suitable for performing and configured to perform at least some of the techniques described herein. In the particular embodiment depicted, the plurality of electronic circuits is at least partially housed within a server computing system 300 suitable for providing at least some functionality of a Virtual Machine Image Importation (VMII) system and of an image execution service, although in other embodiments multiple distinct pluralities of electronic circuits may be used for such execution (e.g., to have distinct computing systems executing the VMII system and the image execution service), or functionality of the image execution service may not be provided. FIG. 3 also illustrates various client/user computing systems 350 that may be used by clients or other users of the VMII system and/or the image execution service, virtual machine computing nodes 360 that may be used by the VMII system and/or the image execution service, and optional other computing systems 380.

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computing systems 350 may each have components similar to those of server computing system 300, including one or more CPUs 351, I/O components 352, storage 354, and memory 357, although some details are not illustrated for the computing systems 350 for the sake of brevity. The other computing systems 380 and computing nodes 360 may also each include components that are similar to some or all of the components illustrated with respect to server computing system 300, but such components are not illustrated in this example for the sake of brevity.

One or more modules 345 of an embodiment of a VMII system 345 are executing in memory 330, and in some embodiments each includes various software instructions that when executed program one or more of the CPU processors 305 to provide an embodiment of a VMII service as described elsewhere herein. The module(s) 345 (e.g., corresponding to some or all of modules 121, 124 and 127 of FIGS. 1 and 2) interact with computing systems 350 and 380 and computing nodes 360 over the network 390 (e.g., via the Internet and/or the World Wide Web, via a private cellular network, etc.). In this example embodiment, the module(s) 345 include functionality related to importing VMIs in configured manners for clients or other users, and optionally further deployment for VMIs imported on behalf of those clients or other users, such as in conjunction with an image execution service provided by module(s) 340. The other computing systems 350 and 380 and computing nodes 360 may also be executing various software as part of interactions with the module(s) 340. For example, client computing systems 350 may be executing software in memory 357 to interact with module(s) 345 (e.g., as part of a Web browser, a specialized client-side application program, etc.), such as to interact with one or more interfaces (not shown) of the VMII service to initiate, configure or monitor the importing of VMIs, as well as to perform various other types of actions discussed in greater detail elsewhere herein. Various information related to the functionality of the module(s) 345 may be stored in storage 320, such as information 321 related to clients of the VMII service (e.g., account information, VMI importation history information, etc.), information 323 related to information or components to use in the VMI modification process (e.g., stored operating system-specific driver and configuration information, stored platform-specific driver and configuration information, etc.), information 325 related to identification vectors associated with known operating systems, and information 327 related to assessment tests to be applied to imported VMIs as part of the operating system identification process. [4] After the module(s) 345 receive requests (or other indications) to import a VMI for a client, the module(s) 345 may store corresponding information (such as a network-accessible location specified by the client to indicate where the VMI to be imported is currently stored), and initiate retrieval of the VMI. In certain scenarios and embodiments, the VMII system may determine to convert the retrieved VMI to a format other than that in which the VMI is currently stored, such as based on a destination VM platform on which virtual machines based on the imported VMI are to be executed. The computing nodes 360 may have various forms in various embodiments, such as to include a number of hosted virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the module(s) 345 may interact with one or more other computing systems 380, such as to retrieve VMI data based on a URL or other location information provided by a client when requesting importation of a VMI. In some embodiments, the module(s) 345 may further interact with image execution service modules 340, such as to deploy a generated VMI on behalf of a client.

One or more modules 340 of an embodiment of an image execution service (e.g., corresponding to modules 110 of FIG. 1) are also executing in memory 330 in this example embodiment, and in some embodiments each includes various software instructions that when executed program one or more of the CPU processors 305 to provide the described functionality for the image execution service, such as to execute virtual machine images and/or other software images for clients. The module(s) 345 in this example interact with the image execution service provided by the module(s) 340 via the server computing system 300 (e.g., via shared memory, an internal bus, etc.), although in other embodiments the VMII system and image execution service may instead interact via one or more intervening computer networks. Various information related to the functionality of the modules 340 may also be stored in storage 320, such as information 329 related to clients of the image execution service and/or executable images to be executed. In addition, one or more other modules 347 may also optionally be executing in memory 330 to provide other functionality.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules 340 and/or 345 may in some embodiments be distributed in additional modules. Similarly, in some embodiments some of the functionality of the modules 340 and/or 345 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the module(s) 340 and/or the module(s) 345) and/or data structures, such as by execution of software instructions of the one or more software programs and/or by storage of such software instructions and/or data structures. Furthermore, in some embodiments, some or all of the systems and/or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
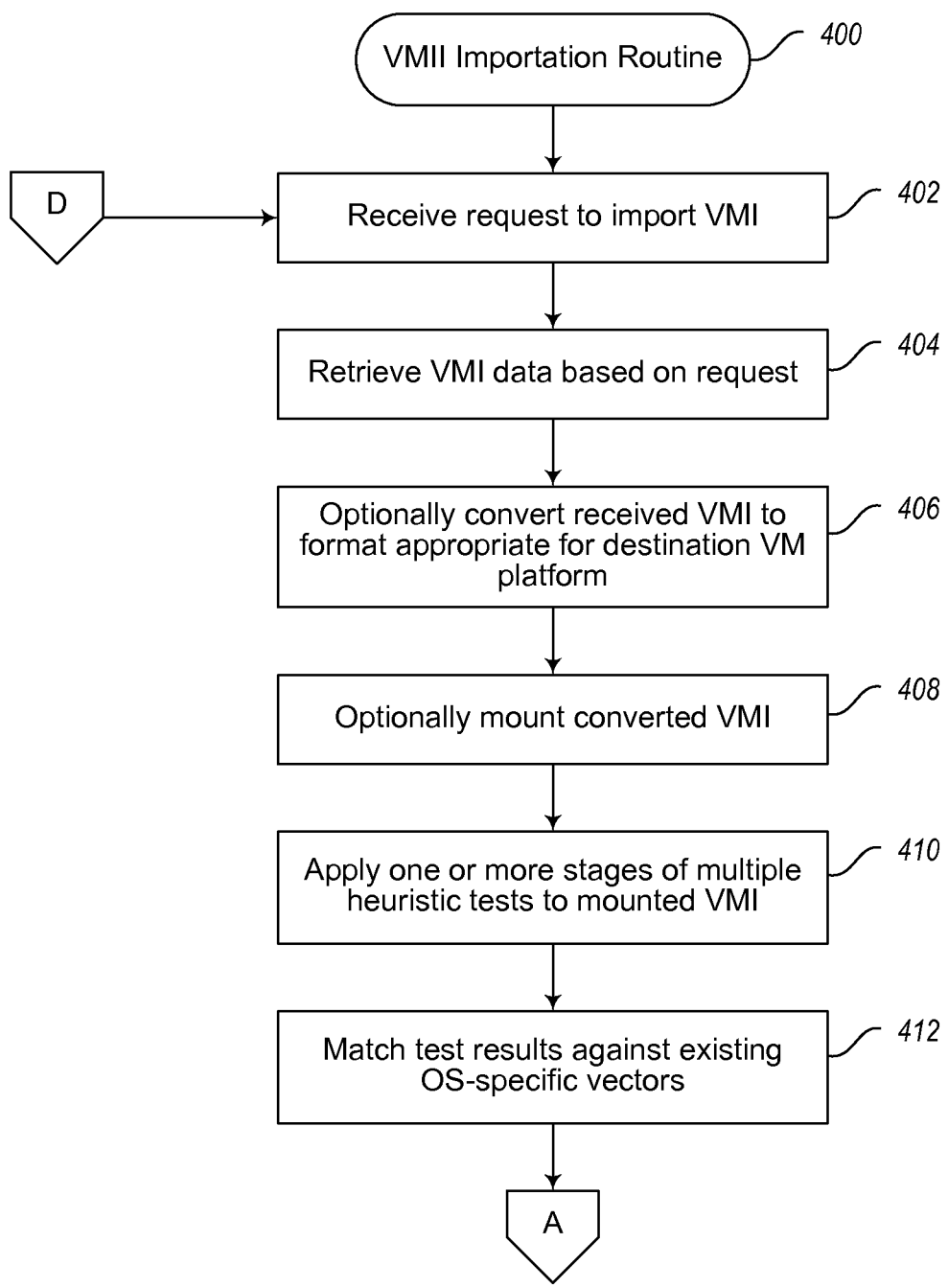
FIGS. 4A-4C illustrate a flow diagram of an example embodiment of a Virtual Machine Image Importation (VMII) service routine.
Figure 4B:
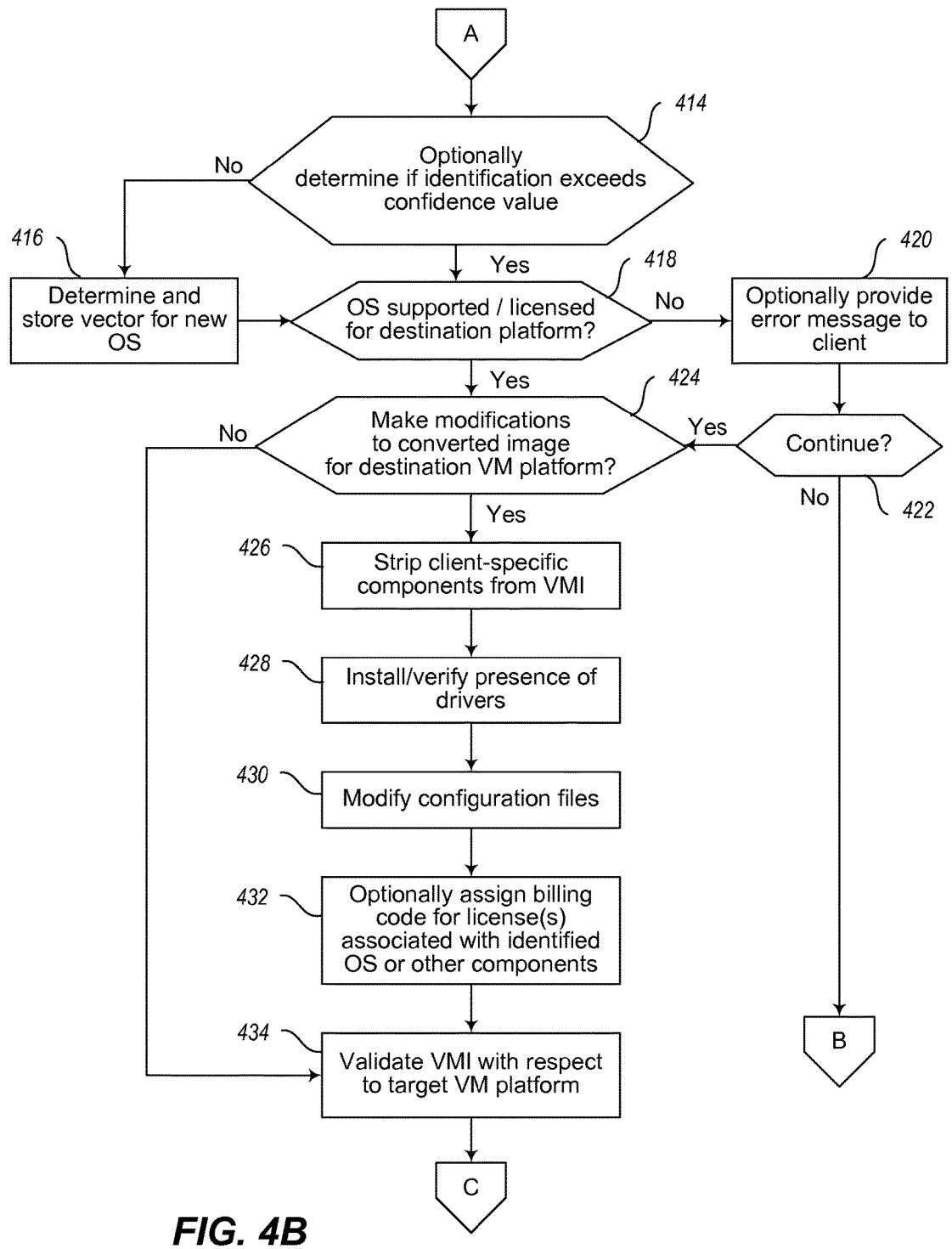
Figure 4C:
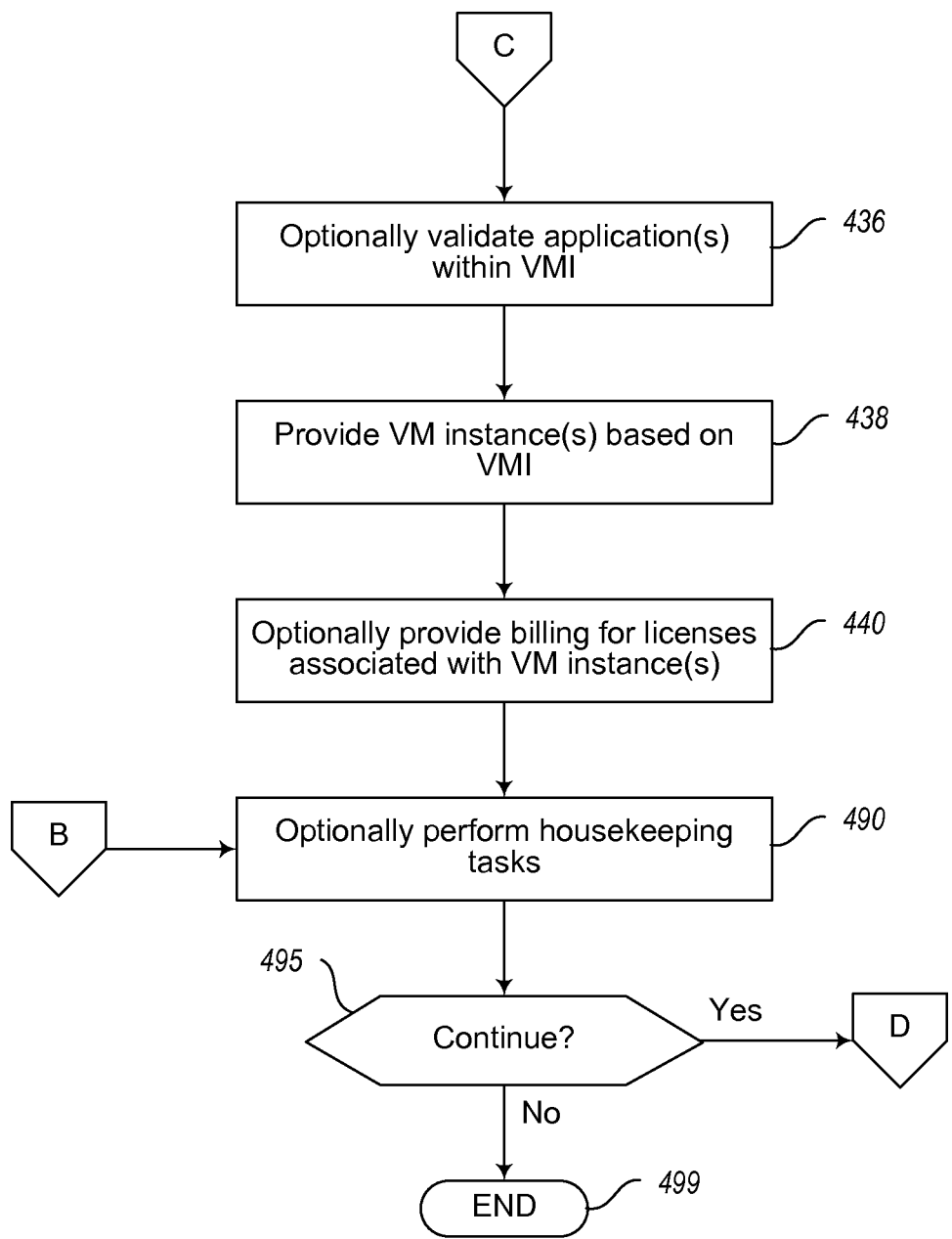

FIGS. 4A-4C depict a flow diagram of an example embodiment of a VMII Service Importation routine 400. The routine may, for example, be provided by execution of the VMII service 120 of FIGS. 1 and 2 and/or by the VMII modules 345 of FIG. 3, such as to provide functionality for clients or other users to initiate, configure or monitor the importing of a specified VMI. While the illustrated embodiment of the routine 400 discusses importing and using virtual machines images, it will be appreciated that similar techniques may be used in other embodiments to import and utilize other types of executable software images. In addition, while the illustrated embodiment of the routine 400 discusses performing operations for a single VMI at a time, it will be appreciated that in other embodiments some or all of the operations of the routine 400 may instead be applied to a group of multiple VMIs at a single time.

The illustrated embodiment of the routine 400 begins at block 402, in which the VMII service receives a request to import a virtual machine image, such as via one or more GUIs and/or one or more APIs provided by the VMII service. In block 404, the routine retrieves a source VMI indicated by the received request. In block 406, the routine optionally converts the source VMI to an appropriate format, such as based on a designated target platform on which virtual machines based on the imported VMI are to be executed. In block 408, the routine optionally attaches the converted VMI for analysis, such as by mounting the converted VMI as a storage volume for an executing virtual machine.

In block 410, the routine applies one or more stages of multiple heuristic assessment tests to the mounted VMI. In block 412, the routine compares test results obtained from the multiple heuristic assessment tests with existing identification vectors for known operating systems (such as may be stored in database 137 of FIG. 1 or storage block 325 of FIG. 3). In block 414, the routine may optionally attempt to confirm an identification of the operating system installed on the assessed VMI, such as by determining if the operating system identification exceeds a defined confidence value. If the operating system identification does not exceed the defined confidence value, the routine may determine to generate and store a new identification vector associated with the operating system installed on the assessed VMI. Once the new identification vector is stored via block 416, or if it is determined that the operating system identification exceeds the defined confidence value, or if the routine does not determine whether such defined confidence value is exceeded, in block 418 the routine determines whether the identified operating system is supported by the destination VM platform, including in certain scenarios and embodiments determining whether the identified operating system may be licensed for use by virtual machines executing on the destination VM platform. If not, the routine in block 420 may optionally provide one or more error messages to the client, and in block 422 determines whether to continue the importation process.

If it was determined in block 418 that the identified operating system is supported by the destination VM platform, or determined in block 422 that the importation process is to continue, in block 424 the routine determines whether to perform one or more modifications to the assessed VMI, such as based on the identified operating system and/or the destination VM platform. If so, in block 426 the routine may optionally strip client-specific components from the assessed VMI; in block 428, the routine may install or verify the presence of one or more device drivers within the assessed VMI; in block 430, the routine may optionally modify one or more configuration files of the assessed VMI; and, in block 432, the routine may optionally assign one or more billing codes for licenses associated with the identified operating system.

Once the modifications to the assessed VMI are completed, or if it was determined in block 424 that no modifications to the assessed VMI were to be performed, the routine continues to block 434 to optionally validate the assessed VMI with respect to the destination VM platform (such as to ensure that the converted and/or modified VMI successfully executes as a virtual machine), and to block 436 to optionally validate one or more software applications identified as being installed within the assessed VMI.

In block 438, the routine optionally provides one or more VM instances based on the imported VMI, such as to initiate execution of such instances using a VMI execution service (e.g., service 105 of FIG. 1, image execution service module(s) 340 of FIG. 3, etc.). The routine then proceeds to block 440, and optionally assigns one or more charges to the client based on license requirements associated with the identified operating system or otherwise related to providing access to VM instances that are based on the imported VMI.

After block 440, or if it was determined in block 422 not to continue with the importation process, the routine continues to block 490 to perform one or more other indicated operations as appropriate, such as various housekeeping tasks. In addition, the routine may perform other activities with respect to clients in block 490, such as other registration activities, obtaining payment for fee-based functionality provided by the VMII service, etc. After block 490, the routine continues to block 495 to determine whether to continue, such as until an explicit indication to terminate is received. If it is determined to continue, the routine returns to block 402 to await additional requests, and otherwise continues to block 499 and ends.

Those skilled in the art will appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

Unless the context requires otherwise, throughout the specification and claims, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

What is claimed is:

1. A computer-implemented method comprising:
receiving, by one or more computing systems of a virtual machine image importation service and from a client of the virtual machine image importation service, a virtual machine image with at least one installed operating system;
retrieving, by the one or more computing systems, a plurality of defined identification vectors that are each associated with one or more of a plurality of known operating systems;
applying, by the one or more computing systems, one or more heuristic assessment tests to the virtual machine image to identify the at least one installed operating system, wherein applying the one or more heuristic assessment tests includes comparing test results from the applying of the one or more heuristic assessment tests with the retrieved plurality of identification vectors;
modifying, by the one or more computing systems and based at least in part on the identified at least one operating system, the virtual machine image by performing one or more modifications to one or more configuration files of the identified at least one operating system; and providing, by the one or more computing systems, access of the client to the modified virtual machine image.

2. The computer-implemented method of claim 1 wherein applying the one or more heuristic assessment tests includes applying at least one assessment test to identify a master boot record of the virtual machine image, a filesystem type of the virtual machine image, a directory structure of the stored virtual machine image, one or more system files of the virtual machine image, or one or more configuration files of the virtual machine image.

3. The computer-implemented method of claim 1 wherein applying the one or more heuristic assessment tests includes applying at least one assessment test to identify at least one application program of the virtual machine image.

4. The computer-implemented method of claim 1 wherein applying the plurality of heuristic assessment tests includes mounting the virtual machine image on an executing virtual machine that includes the plurality of heuristic assessment tests.

5. The computer-implemented method of claim 1, further comprising providing an indication to the client of the identified at least one operating system, and receiving confirmation from the client with respect to the identified at least one operating system.

6. The computer-implemented method of claim 1 wherein the virtual machine image includes multiple installed operating systems, and wherein the method further comprises identifying at least some of the multiple installed operating systems, providing an indication to the client of the identified at least some installed operating systems, and receiving a selection from the client of one of the multiple installed operating systems.

7. The computer-implemented method of claim 1 further comprising, prior to the providing of the access of the client to the modified virtual machine image, validating the modified virtual machine image in accordance with a destination target platform on which the modified virtual machine images to be executed.

8. The computer-implemented method of claim 1 wherein the modifying of the virtual machine image further includes modifying the virtual machine image to include one or more device drivers.

9. The computer-implemented method of claim 1 wherein the modifying of the virtual machine image further includes removing at least some client-specific content included in the stored virtual machine image.

10. The computer-implemented method of claim 9 wherein the at least some client-specific content includes one or more references to one or more storage locations external to an image execution service that will execute the modified virtual machine image.

11. The computer-implemented method of claim 1 wherein the identified at least one operating system is associated with one or more license requirements, and wherein the method further comprises receiving information that satisfies at least one of the one or more associated license requirements from the client.

12. The computer-implemented method of claim 1, further comprising, after providing access of the client to the modified virtual machine image:

receiving a request from the client to export the executing virtual machine; and in response to the request to export the executing virtual machine, performing one or more additional modifications to the modified virtual machine image to reverse at least one of the performed one or more modifications.

13. A computer-implemented method comprising:

receiving, by one or more computing systems of a virtual machine image importation service and from a client of the virtual machine image importation service, a virtual machine image with at least one installed operating system;

applying, by the one or more computing systems, one or more heuristic assessment tests to the virtual machine image to identify the at least one installed operating system;

modifying, by the one or more computing systems and based at least in part on the identified at least one operating system, the virtual machine image by performing one or more modifications to one or more configuration files of the identified at least one operating system;

providing, by the one or more computing systems, access of the client to the modified virtual machine image;

receiving, by the one or more computing systems and from the client, a second image;

importing, by the one or more computing systems, the second image via the virtual machine image importation service without performing modifications to the second image; and providing, by the one or more computing systems, access of the client to the imported second stored image.

14. The computer-implemented method of claim 13 wherein providing access to the modified virtual machine image includes providing the modified virtual machine image to a virtual machine image execution service and initiating execution by the virtual machine image execution service of the modified virtual machine image.

15. The computer-implemented method of claim 14 wherein the identified at least one operating system is associated with one or more license requirements, and wherein the method further comprises assigning one or more charges to the client based on providing access rights from the virtual machine image execution service to the client that satisfy the one or more associated license requirements.

16. A system, comprising:

one or more processors; and at least one memory including instructions that, upon execution by at least one of the one or more processors, cause the system to:

receive, from a client of an image importation service, a software image having at least one installed operating system;

apply, without executing the stored software image, a plurality of assessment tests to the software image to identify the at least one installed operating system by comparing test results from the applied plurality of assessment tests with a plurality of defined identification vectors that are each associated with one or more known operating systems;

modify, based at least in part on the identified at least one operating system, the software image in accordance with an intended destination platform on which to execute the modified software image; and provide access of the client to the modified software image.

17. The system of claim 16 wherein the plurality of assessment tests includes one or more heuristic assessment tests on at least one of a master boot record of the stored software image, a filesystem type of the stored software image, a directory structure of the stored software image, one or more system files of the stored software image, or one or more configuration files of the stored software image.

18. The system of claim 17 wherein the modified software image is a virtual machine image, and wherein the providing of the access to the modified software image includes initiating execution of the modified software image on a hosted virtual machine.

* * * * *

UNITED STATES PATENT AND TRADEMARK OFFICE
CERTIFICATE OF CORRECTION

| | | |
|---|---|---|
| PATENT NO. | : 9,715,400 B1 | Page 1 of 1 |
| APPLICATION NO. | : 14/754359 | |
| DATED | : July 25, 2017 | |
| INVENTOR(S) | : Ekanth Sethuramalingam et al. | |

It is certified that error appears in the above-identified patent and that said Letters Patent is hereby corrected as shown below:

In the Specification

Column 19, Line 41:
"images to be executed." should read, --image is to be executed.--.

Column 20, Line 51:
"apply, without executing the stored software image, a" should read, --apply, without executing the software image, a--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*